(12) United States Patent
Taglienti et al.

(10) Patent No.: US 7,886,349 B2
(45) Date of Patent: Feb. 8, 2011

(54) STATE-FULL PERIMETER SECURITY FOR DATA NETWORKS

(75) Inventors: Claudio Taglienti, Barrington Hills, IL (US); Michael Irizarry, Algonquin, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 1293 days.

(21) Appl. No.: 11/323,237

(22) Filed: Dec. 30, 2005

(65) Prior Publication Data

US 2007/0157301 A1 Jul. 5, 2007

(51) Int. Cl.
*G06F 9/00* (2006.01)
(52) U.S. Cl. ......................................... 726/11; 370/401
(58) Field of Classification Search .................. 726/11; 713/153, 154, 201; 370/351–430; 709/238–244
See application file for complete search history.

(56) References Cited

U.S. PATENT DOCUMENTS

| | | | |
|---|---|---|---|
| 7,443,847 B1 * | 10/2008 | Albert et al. ................. | 370/389 |
| 7,523,491 B2 * | 4/2009 | Dosa Racz et al. ............ | 726/11 |
| 7,568,224 B1 * | 7/2009 | Jennings et al. ............... | 726/14 |
| 2005/0076238 A1 * | 4/2005 | Ormazabal et al. .......... | 713/201 |
| 2006/0174336 A1 * | 8/2006 | Chen .......................... | 726/11 |
| 2007/0143858 A1 * | 6/2007 | Hearty ........................ | 726/27 |

OTHER PUBLICATIONS

Singh et al., "Failover and Load Sharing in SIP Telephony", 2004, http://www.cs.columbia.edu/techreports/cucs-011-04.pdf.*
A. B. Roach, "RFC 3265: Session Initiation Protocol (SIP)-specific Event Notification", Network Working Group, Jun. 2002, http://www.ietf.org/rfc/rfc3265.txt.*
Bozinovski et al., "Performance Evaluation of a SIP-based State-sharing Mechanism", IEEE, 2002, pp. 2041-2045.*
Roach, A.B., "Session Initiation Protocol (SIP)-Specific Event Notification," RFC 3265, Jun. 2002; pp. 1-34.

* cited by examiner

*Primary Examiner*—Brandon S Hoffman
*Assistant Examiner*—Hee Song
(74) *Attorney, Agent, or Firm*—Leydig, Voit & Mayer, Ltd.

(57) ABSTRACT

The described embodiments include a system for controlling communications between a first network and a second network including a plurality of in-line security devices, the in-line security devices being configured to manage communication between the first network and the second network, and including a state server connected to the plurality of in-line security devices, the state server being configured to receive state information about the state of the connections established by a first one of the in-line security devices and to communicate the state information to at least a second one of said in-line security devices. In one embodiment, the in-line security devices are firewalls. In another embodiment, state server communicates the state information received from the first one of the firewall devices and communicates the state information to every other one of the plurality of firewall devices.

10 Claims, 8 Drawing Sheets

STATE-FULL PERIMETER SECURITY FOR DATA NETWORKS

FIELD OF THE INVENTION

The present invention relates to the field of providing security in data networks. More specifically, the present invention relates to providing secure perimeter control for a network while allowing seamless connections for users on the network to an external network.

BACKGROUND OF THE INVENTION

When a private network is connected to a public network, such as the Internet, precautions must be taken to insure that unauthorized use of private data and facilities does not occur. However, it is necessary to allow desired connections to Internet services. To allow connectivity to the external network while maintaining security of the private network, perimeter security devices, such as firewalls, have been developed and deployed.

Perimeter security devices allow information to pass from within the private network to the intended target using standard protocols. All transmissions from outside of the private network are captured and screened by the perimeter security device. If the transmission is legitimate, the transmission is routed to the appropriate device on the private network. If not, the transmission is blocked. This rather simple process is adequate for some types of transmissions, but many transactions require much more sophisticated connections.

For example, the security perimeter device must allow negotiated services to flow between the end-points based on the negotiated parameters until the bearer session is taken down. Examples of these types of services are Voice Over IP (VOIP) and streaming audio or video. These types of connections are established using a control plane protocols, such as Session Initiation Protocol (SIP), Session Description Protocol (SDP), Real-Time Streaming Protocol (RTSP), and HyperText Transfer Protocol (HTTP) to set up traffic using associated high-speed bearer plane protocols. The security perimeter device must understand the specific control plane protocols in order to know when to allow bearer plane traffic (example VOIP, Streaming Audio) for a given user.

Figure 1:
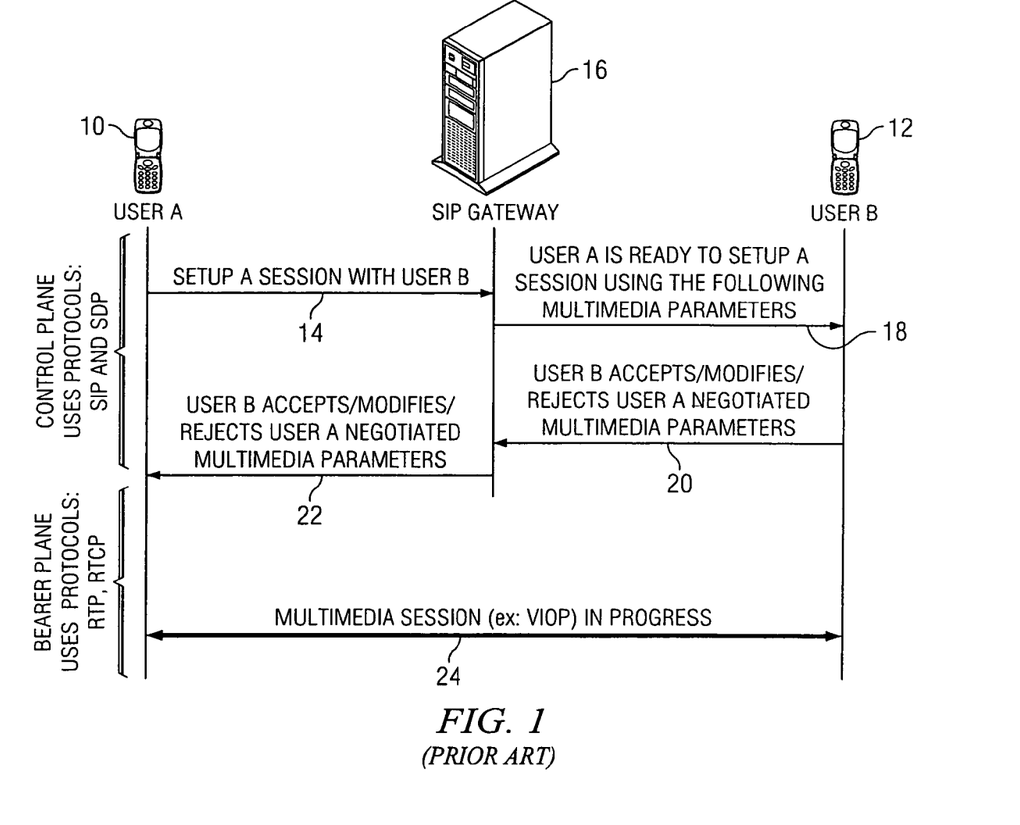
FIG. 1 is a diagram illustrating the high-level steps for forming a VOIP connection.

An example of setting up a session using SIP is shown in FIG. 1. In this example, a user A at mobile phone 10 wants to set up a VOIP connection with the mobile phone 12 of user B. Mobile phone 10 sends a setup request 14 to a SIP gateway 16. The SIP gateway 16 determines the location of mobile phone 10 and sends a setup request 18 including the multimedia parameters needed for the session. Mobile phone 12 then accepts, modifies or rejects those parameters in a setup response 20. A relayed setup response 22 is then passed to cell phone 10 by the SIP gateway 16. Assuming the setup is properly negotiated, a bearer plane multimedia session link 24 is established between mobile phone 10 and mobile phone 12.

Figure 2:
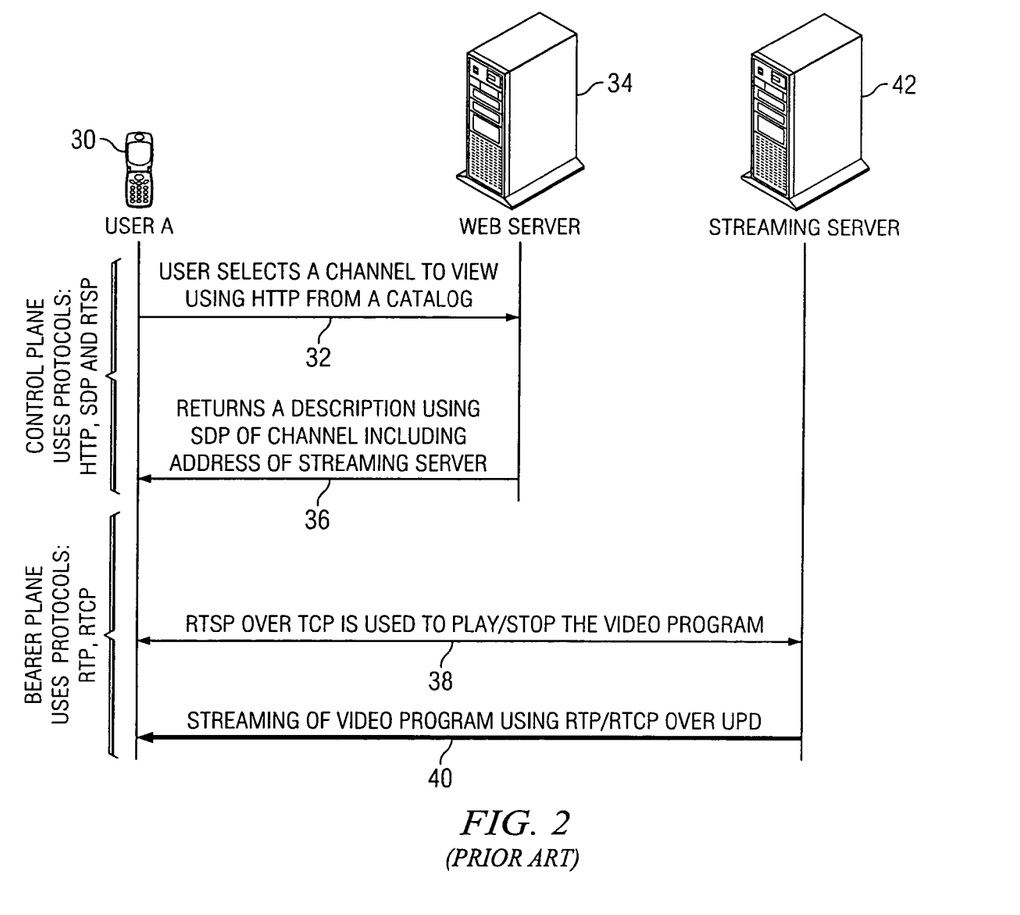
FIG. 2 is a diagram illustrating the high-level steps for forming a streaming media connection.

An example of setting up a streaming media session is shown in FIG. 2. In this example, the user of mobile phone 30 is selecting a streaming video by selecting a hypertext link using her Web browser. The HTTP base request 32 is sent to Web server 34. Web server 34 returns an SDP channel and address description 36. Using this information, mobile phone 30 negotiates 38 a link 40 with streaming server 42 by which it receives the requested streaming video. RTSP is also a protocol used for set up of multimedia sessions such as video and/or audio streaming. SIP and RTSP are "control plane protocols" that are completely independent from the multimedia services they set up and control. The protocols used for the multimedia services themselves are also known as "bearer plane protocols".

Firewalls in use today include facilities for dealing with these complex protocols. These firewalls apply security policies based on the session state including both the control and bearer plane traffic for a given user session. Control plane traffic, such as RTSP, SIP & SDP, is intercepted so that negotiated port numbers (port numbers used by both ends of the communication link), sometimes the IP address of the destination end-point of the communication, and multimedia characteristics used during the communications (for example, voice in one direction and video in the other) can be intercepted and captured. The firewall will then only allow traffic that complies with the negotiated parameters. These in-line security devices must also understand when the session is terminated so that they can stop allowing traffic between the original end-points of the communication link. The key to the ability of these security devices to perform their function is to remember specific characteristics (session state) of a user session in order to apply appropriate security measures. The control plane information is required because the logic is needed to remember and process the bearer traffic, and thus must be local to the security device itself. This information allows the firewall to respond properly to traffic on this session and to determine when the session has been closed. However, major installations may include large numbers of firewalls. In addition, in networks serving mobile users, such as mobile phones, may require multiple firewalls that are separated by geography and other factors.

Figure 3:
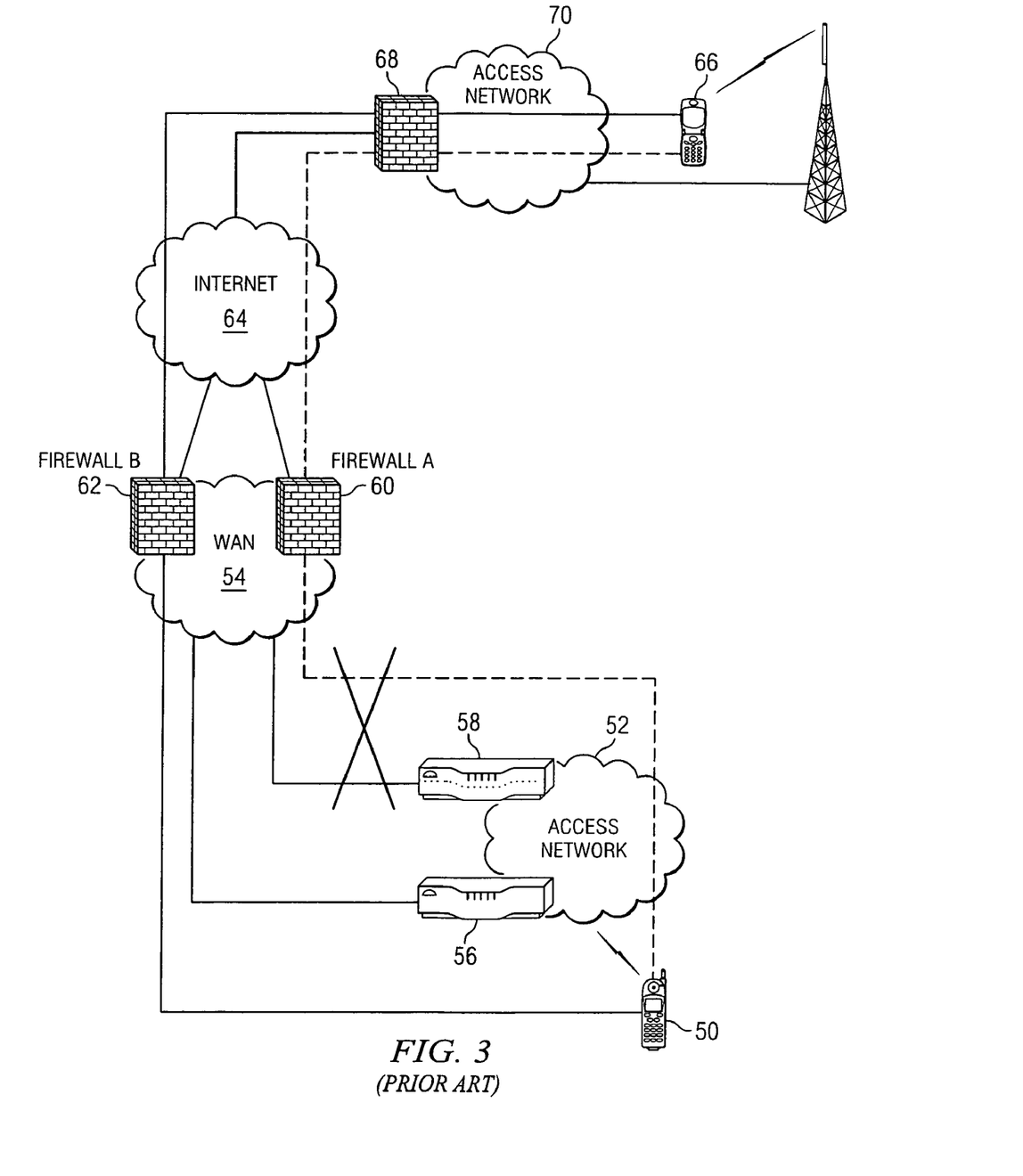
FIG. 3 is a topological diagram showing two mobile devices connected via the Internet.

An example of such a network is shown in FIG. 3. Mobile device 50 connects to WAN network 54 via access network 52. Access network 52 includes all of the necessary equipment to provide the cell phone connection, such as antenna towers, codecs, management network, etc. Access network 52 routes data connections to WAN network 54 via routers such as routers 56 and 58. WAN network 54 connects to the Internet 64 via either firewall A 60 or firewall B 62.

When the mobile user wants to make a VOIP call to mobile phone 66, control plane signals are passed through firewall A 60, through the Internet to firewall 68 and on to mobile phone 66 through that user's access network 70. The connection is negotiated and the state of the connection is stored in firewall 60 and firewall 68. The VOIP traffic is then carried on the negotiated bearer link through firewall 60 and firewall 68.

However, in situations where firewall 60 fails, no traffic will be allowed to go through another security device, such as firewall 62, even if another geographically redundant security device is available and both bearer and control traffic can be redirected through it. The only way to recover from this state of affairs is to take the entire session down (Voice conversation down or streaming video is stopped) and restart the session via the new security device.

An even worse case scenario is a situation where network operators (Internet Service Providers) have multiple exit/entry points to the Internet and allow traffic to exit/re-enter from the least congested one. However, control and bearer traffic are required to go through the same security device. In this case, the internal management systems of the WAN 54 may send the bearer traffic to firewall 62. However, since firewall 62 includes no information regarding the state of the established link, the transmission will be blocked and the VOIP connection will fail.

Operators utilize very complicated routing architectures that are difficult to deploy, maintain and support in order to overcome the requirement that both bearer and control traffic use the same security device for a given user session. Hence these security devices are tightly coupled to the routing topology of the network in which they operate. Any change to the topology will have an immediate impact on the ability of the device to operate correctly.

Even with these complex routing architectures, routing must be designed to ensure that the same set of firewalls be used to exit and re-enter a given network. This poses problems in the following scenarios:

Failure in a single exit/entry point for a data network that provides geographic redundant access for the following types of traffic:

TCP/IP→Maintaining state across firewalls geographically deployed→Applications: Web Browsing, any HTTP based app RTSP/RTP dynamically assigning UDP ports (for inbound network initiated connections) across firewalls geographically deployed→Applications: Audio/Video Streaming SIP/RTP dynamically assigning UDP ports for peer-to-peer communication→Applications: PTT, VOIP As we will see, however, the very strength of IP routing will become the biggest challenge for security devices such as firewalls. IP routing ensures that between any two communicating endpoints, IP packets are free to take the "best" path to reach each other and this path can change during the course of communication. This flexibility of IP routing presents challenges for in-line security devices such as state-full firewalls (see FIG. 3).

SUMMARY OF THE INVENTION

The described embodiments of the present invention include a system for controlling communications between a first network and a second network including a plurality of in-line security devices, the in-line security devices being configured to manage communication between the first network and the second network, and including a state server connected to the plurality of in-line security devices, the state server being configured to receive state information about the state of the connections established by a first one of the in-line security devices and to communicate the state information to at least a second one of said in-line security devices. In one embodiment, the in-line security devices are firewalls. In another embodiment, state server communicates the state information received from the first one of the firewall devices and communicates the state information to every other one of the plurality of firewall devices.

In another embodiment, a secondary state server is included. The secondary state server is configured to receive the state information from the state server and provide the state information to the plurality of in-line security devices if the state server fails for whatever reason.

These embodiments allow for access to state information available across the network via a well defined protocol/access method. This allows uninterrupted functionality in case of failure of a given geographically deployed security device or failure of perimeter security devices from the same or from different manufacturers. These different security devices are used in the same user session and the handover is nearly transparent to the user.

These embodiments allow for access to state information available across the network via a well defined protocol/access method. This also allows uninterrupted functionality in the case where network congestion causes control and/or bearer traffic for the same user session to traverse multiple security devices. These different security devices are used in the same user session and the handover is nearly transparent to the user The described embodiments also include a method for controlling communications between a first network and a second network including providing a plurality of in-line security devices, establishing communication between the first network and the second network via the in-line security devices, providing a state server connected to the plurality of in-line security devices, transmitting state information from a first one of the in-line security devices about the state of the connections established by the a first one of the in-line security devices, and communicating the state information from the state server to at least a second one of said in-line security devices.

DETAILED DESCRIPTION OF THE INVENTION

Figure 4:
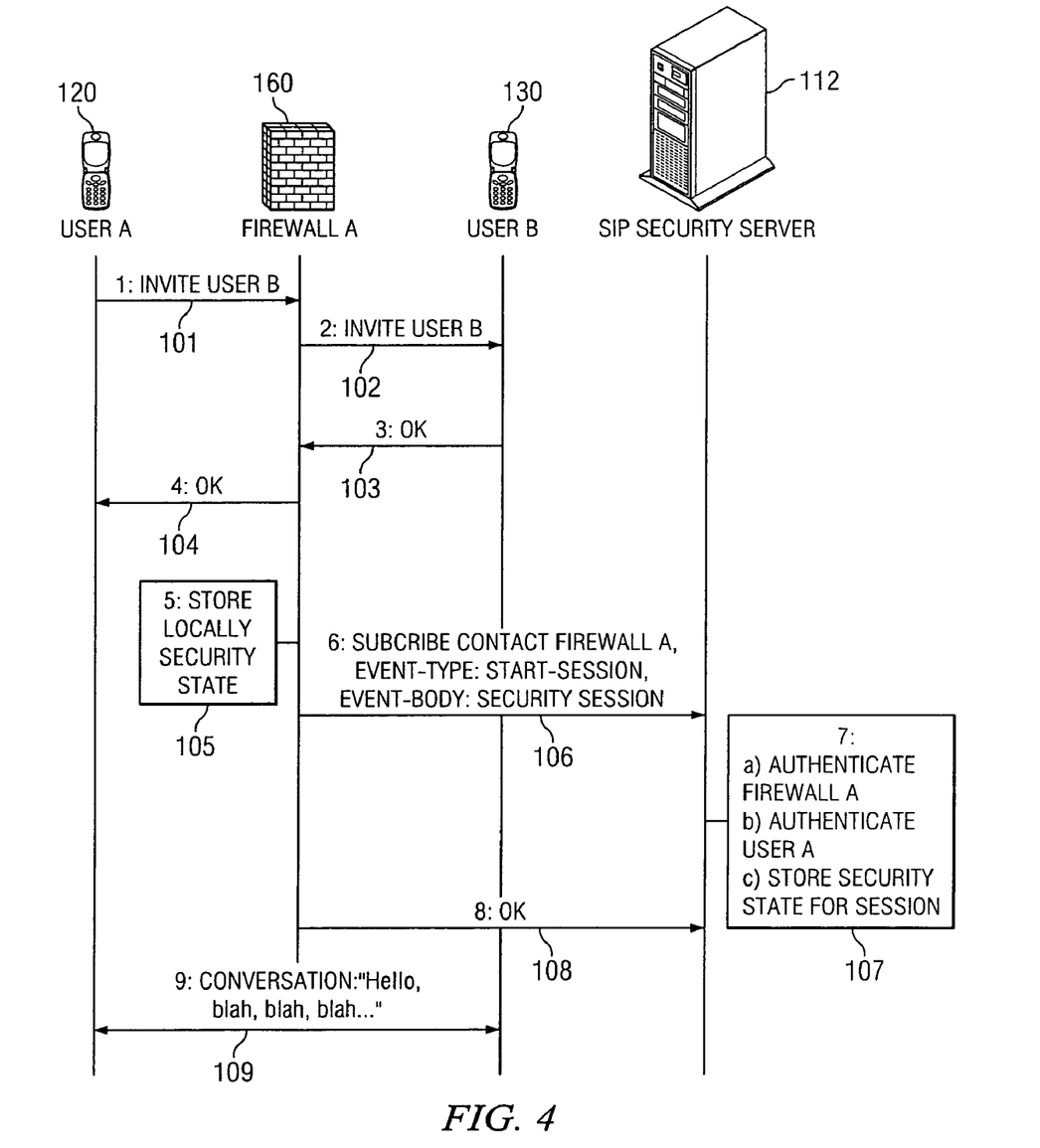
FIG. 4 is a diagram including an embodiment of the invention with a diagram illustrating a method of operation that is another embodiment of the invention.

A preferred embodiment of the present invention is shown in FIG. 4. In this embodiment, SIP security server 112 functions as a state server and is used to store the state information created by firewall 160. An SIP security server is used in this embodiment because the SIP protocol provides convenient tools for implementing the invention. However, the scope of the invention is by no means limited to an SIP security server. Any number of storage devices may be suitably used as a state server within the scope of the invention. In FIG. 4, user A on mobile device 120 wants to make a VOIP connection with user B on mobile device 130.

In step 101, mobile device 120 sends an invitation to firewall 160, which is relayed to mobile device 130 in step 102. Firewall 160 is provided in this embodiment as an example of an in-line security device. In step 103, mobile device 130 sends an OK to create the VOIP link, which is relayed to mobile device 120 at step 104. The security state information for this connection is stored in firewall 160 at step 105. Next, firewall 160 issues a request to subscribe the session with SIP security server 112 in step 106. This subscription request includes the event type and all or a part of the security state information for the connection created via firewall 160. At step 107, SIP security server authenticates firewall 160 and user A and, after authentication, stores the security state information. In step 108, the SIP security server 112 acknowledges receipt and storage of the state information. In step 109, the bearer link is established. The session state is transient. It is created when a session starts and destroyed when the bearer session terminates, when the security server reboots or when the session expires. In this embodiment, messages created on SIP security server 112 using SIP messages include an "expires" header as defined by the SIP protocol (RFC 3265). Therefore, even if they are not properly closed, as described below, they will not remain open indefinitely.

Figure 5:
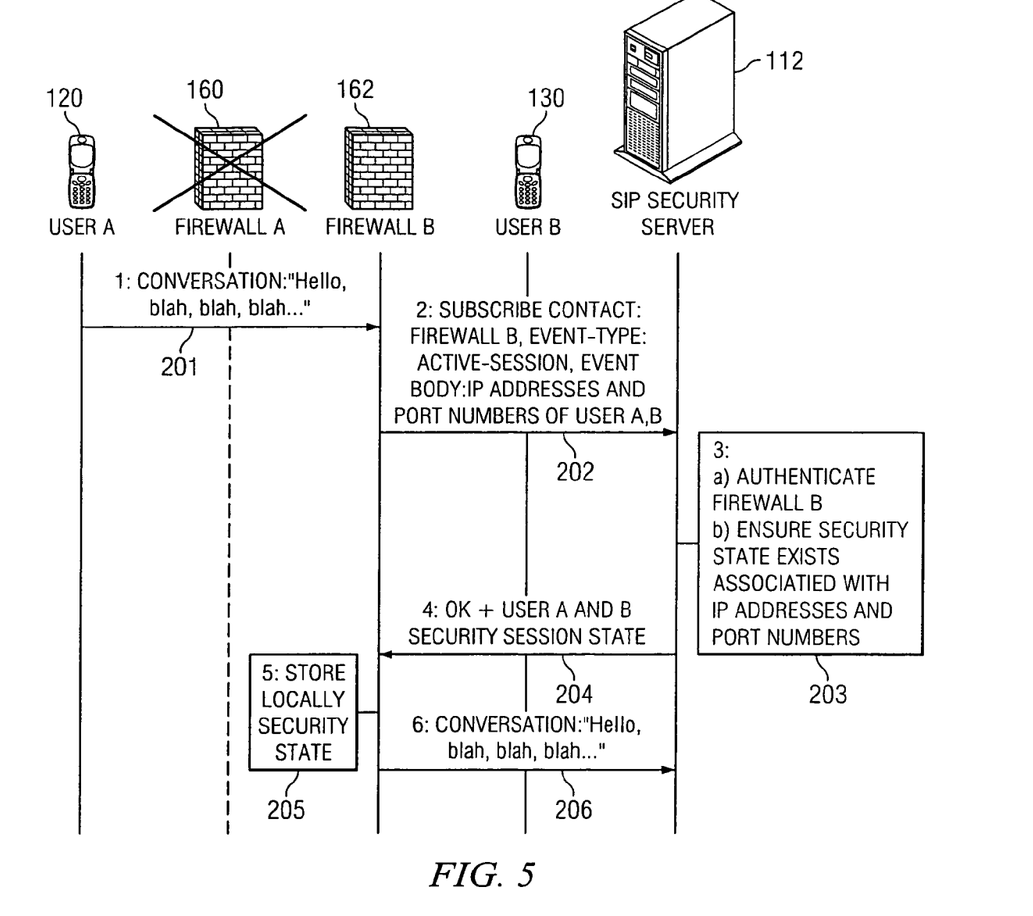
FIG. 5 is a diagram showing the operation of the embodiments of FIG. 4 when firewall A is not available.

FIG. 5 illustrates the operation of the embodiment of FIG. 4 when firewall 160 is no longer available. Any number of events may cause firewall 160 to be unavailable to maintain the bearer link between mobile devices 120 and 130. Congestion may make firewall 160 unable to maintain a link having sufficient bandwidth. By providing a seamless way to maintain a bearer link of sufficient capacity, the present invention can be used within a system to maintain quality of service (QoS) standards. In addition, firewall 160 may have simply failed. Further, in a mobile environment, movement of user A may necessitate a changeover to another firewall.

Because firewall 160 is not available, the bearer link data is transmitted to firewall 162 in step 201. After determining that it does not have security state information for the link (step not shown), in step 202, firewall B sends a subscription request to SIP security server 112 with the information to identify the bearer link involved. In step 203, the SIP security server authenticates firewall 162 and determines if a security state entry exists for the bearer link received by firewall 162. If so, SIP security server 112 acknowledges the authenticity of the link and sends the security state information to firewall 162 in step 204. This information is stored in firewall 162 in step 205. Using this information, the bearer link is completed via firewall 162 in step 206.

Figure 6:
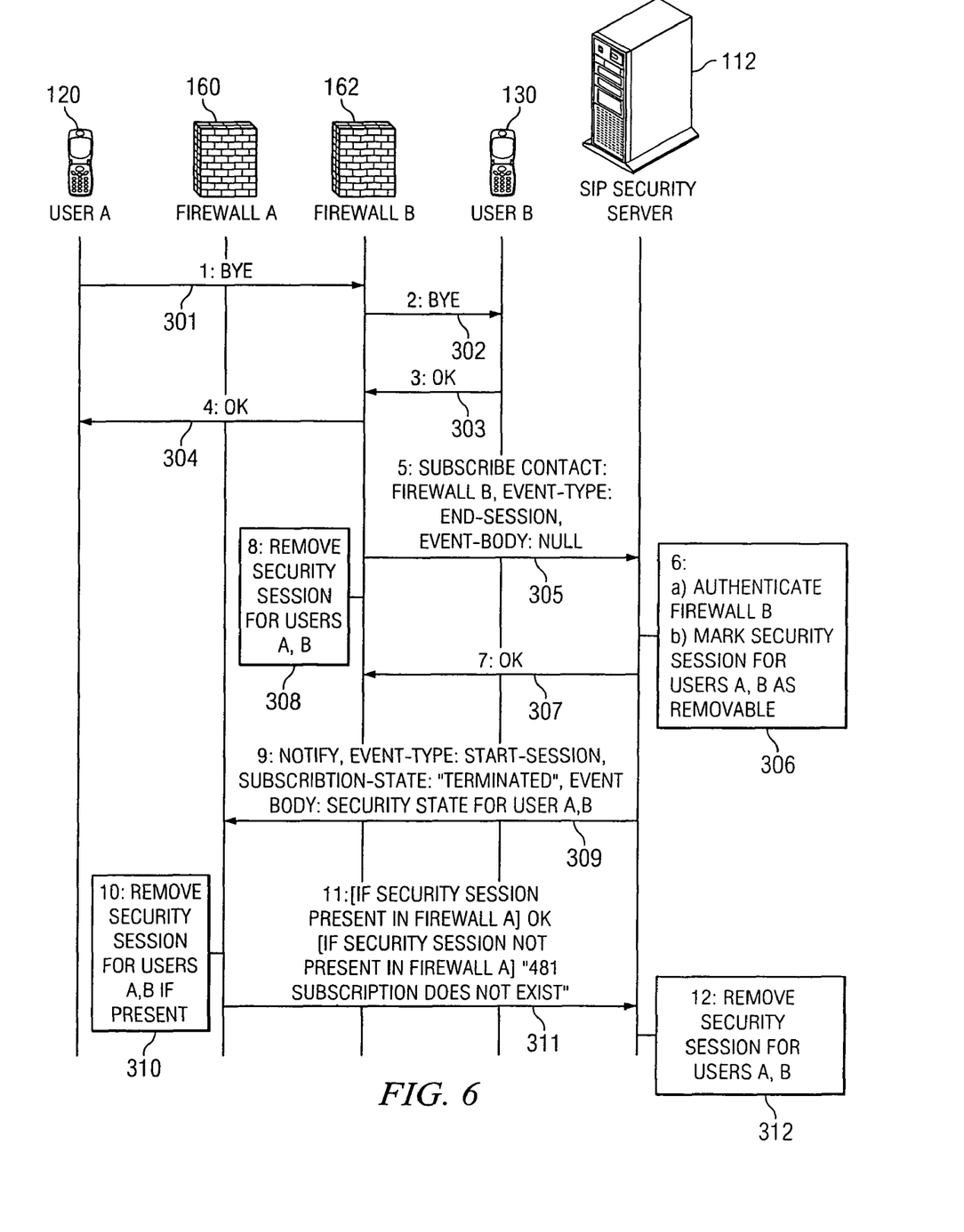
FIG. 6 is a diagram is a diagram illustrating closing a connection in the embodiments of FIG. 4.

FIG. 6 illustrates the process of closing the bearer link established in FIG. 4 and subsequently diverted through firewall 162 in FIG. 5. When user A disconnects, mobile device 120 sends a closing command at step 301, which is relayed to mobile device 130 by firewall 162 in step 302. The closing command is acknowledged by mobile device 130 in step 303. This acknowledgement is relayed to mobile device 120 by firewall 162 in step 304. In addition, in step 305, firewall 162 sends a subscription command to SIP security server 112 indicating that the session has been closed. In step 306, the SIP security server 112 authenticates firewall 162 and then marks the security state information for that session for closing. The security state session for every firewall that subscribed to the security state information must be closed. Because firewall 162 sent the closing subscription command, SIP security server 112 simply acknowledges receipt of the command in step 307. In response to the acknowledgement, firewall 162 removes the security session in step 308. SIP security server 112 also sends a session "terminated" command to each additional firewall, like it does to firewall 160 in step 309. Firewall 160 removes the security session in step 310 and acknowledges closing the session in step 311. After all security sessions in the firewalls have been closed, the security session in the SIP security server 112 is removed in step 312.

The described embodiments of the present invention allow control and bearer traffic for a given user session to be handled on different security devices. That is, any security device in the private network, while receiving only bearer traffic can:

Authenticate the user and thus authorize access through the device;

Apply appropriate security policies based on the negotiated parameters used during session setup, even if this device never intercepted the set up messages to initiate the session for this user; and Stop applying security policies for this user when the session is torn down.

In order to satisfy the three above requirements the session state is no longer only stored locally within the security device itself, but also be stored in the private network (owned by the operator).

Thus, the protocols, IP addresses, port numbers used to setup and control the multimedia services are completely decoupled from the services themselves as the control and bearer planes use separate connections altogether. This allows manipulation of the multimedia session while the bearer session (two parties talking, or a party receiving a video stream) is in progress. Even though the connection is transferred to another security device, the user traffic will continue to flow through.

For example, because the bearer and control planes support multimedia services using different connections, different protocols, and different servers (different IP addresses and port numbers), the path (route) taken by say SIP and SDP traffic from a user A attempting to set up a connection to user B need not be the same as the voice traffic itself. The same holds true for the example shown in FIG. 2 where multiple servers need to be contacted to set up a video streaming session.

In a preferred embodiment, the session state will be stored in a set of SIP (Session Initiation Protocol) Event Servers 112 deployed in a geographic redundant configuration within the operator network. The protocol used to add and remove sessions in the SIP Servers is SIP and in particular RFC 3265— "SIP Specific Event Notification". Because of the transient nature of sessions, SIP is a preferred choice for describing session creation and destruction events. For realizing the actual event delivery functionality, RFC 3265 introduces two SIP methods, namely SUBSCRIBE and NOTIFY. A subscriber (security device) sends the former message for initial subscription to an event (for example session created, session active, or session terminated) and receives the latter for the initial notification and all subsequent ones that are related to this subscription. For that, the SIP infrastructure is used to route the subscription and notification requests from the subscribers (security devices) to SIP event servers, hosting the security session state information of the particular event.

Figure 7:
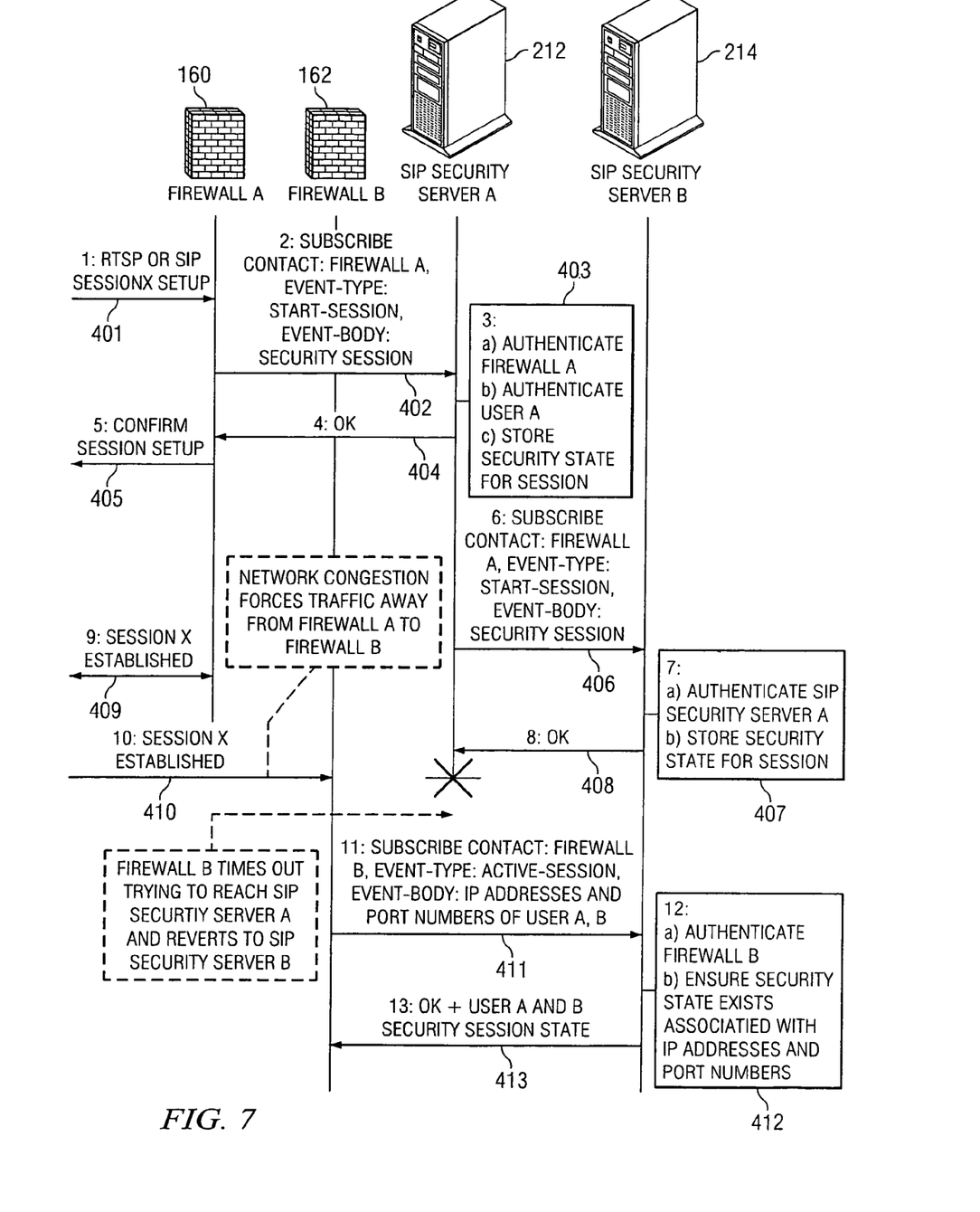
FIG. 7 is a diagram including another embodiment of the invention dealing with state redundancy with a diagram illustrating a method of operation that is another embodiment of the invention.
Figure 8:
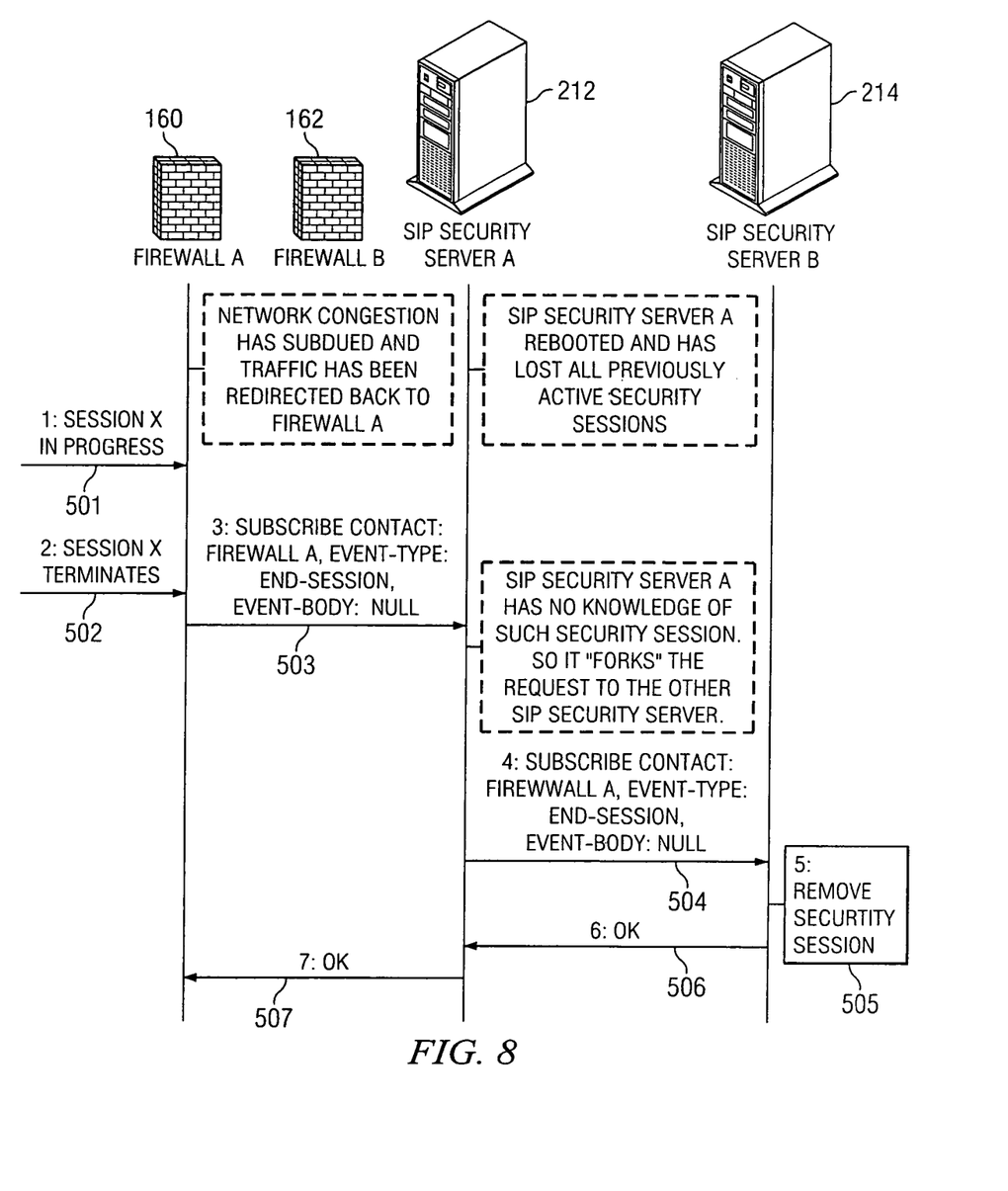
FIG. 8 is a diagram dealing with state redundancy illustrating operational aspects of the embodiments of FIG. 6.

Redundancy:

The described embodiments of the present invention illustrated in FIGS. 7 and 8 include mechanisms for supporting the ability to continue operation in the face of failure of a given SIP Security Server. In these examples, SIP security servers 212 and 214 can be housed at different locations, thus supporting a geographically redundant deployment of SIP Security Servers. Firewalls 160 and 162 are configured with the address of all SIP Security Servers that participate in the geographic redundant configuration. Firewalls 160 and 162 are also configured with a time out and number of retries parameters for detection of the failure of a given SIP Security Server. The SIP Security Servers that participate in the geographic redundant configuration are characterized as:

A primary SIP Security Server. This is the server that a security device always attempts to contact first. In this example, SIP security server 212 is the primary server. Only if this server is not responding will the security device contact the servers in the secondary list.

A list of secondary SIP Security Servers. The list has a size of N servers where N>=1.

In FIGS. 7 and 8, the size of the secondary SIP Security Servers list is one. Note that this invention recommends duplicating the security state held by the primary SIP security server to only one other secondary SIP security server. This holds true even in situations where the size of the secondary SIP Security Servers list is greater than one. This decision is based on the fact that the cost of completely synchronizing the security state across all SIP Security Servers outweighs the envisioned average lifespan of security states. The preferred embodiment will limit the number of synchronized SIP Security Servers to two.

In the steps illustrated in FIG. 7, a device initiates a session using a control plane protocol in step 401. In addition to establishing the requested session (not shown), firewall 160 sends a subscription command with details of the session to the primary SIP security server, which is SIP security server 212, in step 402. In step 403, SIP security server 212 authenticates firewall 160 and the user that initiated the session. If both are authentic, the session security state information is stored. This is acknowledged to firewall 160 in step 404. In step 405, firewall 160 acknowledges to the users device that the session has been established.

After the session is established, SIP security server 212 sends a subscription command to redundant SIP security server 214 with information about the session just established in step 406. In step 407, SIP security server 214 authenticates SIP security server A and stores the security session information. This is acknowledged in step 408 and session X is established in step 409.

Next it is assumed that two problems have occurred. First, network congestion forces the session X to firewall 162. Second, SIP security server 212 has failed. In step 410, session X is established on firewall 162. Firewall 162 sends a subscription command to SIP security server 212. However, SIP security server 212 has failed, so the subscription command is never acknowledged. After an alotted time for the acknowledgement has expired, in step 411, firewall 162 sends a subscription command to SIP server 214. SIP server 214 authenticates firewall 162 and determines if state information matching session X is stored in step 412. If the session information is found, the information and an acknowledgement is sent to firewall 162 in step 413. This allows for servicing of session X through firewall 162.

In FIG. 8, it is assumed that session X has been redirected back to firewall 160 because the congestion on firewall 160 has subsided, as shown in step 501. In step 502, the user terminates session X. In response, firewall 160 sends an end session subscription command to primary SIP security server 212 in step 503. However, as noted above, this server failed. It has been rebooted and has no knowledge of session X. It assumes that the secondary server does have this session stored and forwards the end session subscription command to SIP security server 214 in step 504. It should be noted that step 504 will occur whether SIP security server 212 has been rebooted or not. In step 505, session X information is removed from SIP security server 214. An acknowledgement is set to SIP security server 212 in step 506. In response to that acknowledgement, and acknowledgement is sent from SIP security server 212 to firewall 160 in step 507.

Although specific embodiments of the invention are described herein, they are not to be construed as limiting the scope of the invention. Many other embodiments of the invention will become apparent to those skilled in the art in light of the teachings of this application. For example, although the embodiments described herein use firewalls as in-line security devices, the use of any in-line security device is within the scope of the invention. In addition, although the described embodiments provide links between mobile devices, the invention is not limited to this type of device. The invention will provide more stable and robust links for any device in need of a connection through in-line security devices. The scope of the invention is limited only by the claims appended hereto.

We claim:

1. A system for handover of a security state of a communication session among a plurality of in-line security devices using Session Initiation Protocol (SIP) methods, the system comprising:

the plurality of in-line security devices configured to manage communication between a first network and a second network by storing the security state of the communication session;

a SIP state server connected to the plurality of in-line security devices, the SIP state server being configured to maintain the communication session in an event of unavailability of at least one of the plurality of in-line security devices by handing off the security state of the communication session between two or more of the in-line security devices by way of receiving state information about the state of the connections established by a first in-line security device and communicating the state information to at least a second in-line security device, the SIP state server further configured to authenticate at least one of the plurality of in-line security devices; and a secondary SIP state server configured to maintain the communication session in an event of unavailability of the SIP state server by: (a) authenticating the SIP state server, (b) receiving the state information from the SIP state server, and (c) providing the state information to at least one of the plurality of in-line security devices.

2. A system as in claim 1 wherein the in-line security devices are firewalls.

3. A system as in claim 2 wherein the SIP state server communicates the state information received from the first firewall device to every other one of the plurality of firewall devices.

4. The system of claim 1 wherein the SIP state server and the secondary SIP state server are geographically dispersed.

5. A method for handover of a security state of a communication session among a plurality of in-line security devices using Session Initiation Protocol (SIP) methods, the method comprising:

providing a plurality of in-line security devices;

establishing communication between a first network and a second network via a first in-line security device;

storing the security state of the communication session in the first in-line security device;

providing a SIP state server connected to the plurality of in-line security devices, the SIP state server configured to maintain the communication session in an event of unavailability of at least one of the plurality of in-line security devices by handing off the security state of the communication session from the first in-line security device to a second in-line security device and further configured to authenticate at least one of the plurality of in-line security devices, wherein the state server: (a) receives the security state information from the first in-line security device about a state of connections established by the first in-line security device, and (b) communicates the security state information to at least a second in-line security device; and providing a secondary SIP state server configured to maintain the communication session in an event of unavailability of the SIP state server by: (a) authenticating the SIP state server, (b) receiving the security state information from the SIP state server, and (c) providing the security state information to at least one of the plurality of in-line security devices.

6. A method as in claim 5 wherein the in-line security devices are firewalls.

7. A method as in claim 6 wherein the SIP state server communicates the state information received from the first firewall device to every other one of the plurality of firewall devices.

8. A method as in claim 5 wherein the communication of the state information from the SIP state server to at least a second one of said in-line security devices occurs in response to a communication link being diverted from the first one of the in-line security devices to the at least second one of the in-line security devices.

9. A method as in claim 5 further comprising, when a communication link established by first in-line security device is closed, notifying the SIP state server and deleting the information on the state of the communication link from the SIP state server.

10. The method of claim 5 wherein the SIP state server and the secondary SIP state server are geographically dispersed.

* * * * *